United States Patent
Takeuchi et al.

(10) Patent No.: US 11,822,846 B2
(45) Date of Patent: Nov. 21, 2023

(54) OPERATION STATUS DISPLAY DEVICE AND OPERATION STATUS DISPLAY METHOD

(71) Applicant: FUJI CORPORATION, Chiryu (JP)

(72) Inventors: Shinya Takeuchi, Toyoake (JP); Yusuke Kikuchi, Chiryu (JP); Shinichi Naka, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 26 days.

(21) Appl. No.: 17/776,659

(22) PCT Filed: Nov. 15, 2019

(86) PCT No.: PCT/JP2019/044966
§ 371 (c)(1),
(2) Date: May 13, 2022

(87) PCT Pub. No.: WO2021/095264
PCT Pub. Date: May 20, 2021

(65) Prior Publication Data
US 2022/0398054 A1    Dec. 15, 2022

(51) Int. Cl.
*G06F 3/14*     (2006.01)
*G06T 11/20*    (2006.01)

(52) U.S. Cl.
CPC .............. *G06F 3/14* (2013.01); *G06T 11/206* (2013.01)

(58) Field of Classification Search
None
See application file for complete search history.

(56) References Cited

U.S. PATENT DOCUMENTS

2015/0334889 A1    11/2015    Nishijima et al.

FOREIGN PATENT DOCUMENTS

| JP | 2005-108255 A | 4/2005 |
|----|---------------|--------|
| JP | 2005-284818 A | 10/2005 |

(Continued)

OTHER PUBLICATIONS

Cuatrecasas-Arbos et al.; "The Operations-Time Chart: A graphical tool to evaluate the performance of production systems—From batch-and-queue to lean manufacturing;" Computers & Industrial Engineering 61 (2011) pp. 663-675; Elsevier Ltd. (Year: 2011).*

(Continued)

*Primary Examiner* — Edward Martello
(74) *Attorney, Agent, or Firm* — Oblon, McClelland, Maier & Neustadt, L.L.P.

(57) ABSTRACT

An operation status display device displays an operation status of a board work machine, in which an operator replenishes an article to be used in production of a board product, and the operation status display device includes an acquisition section and a display section. The acquisition section is configured to acquire a first time, which is a wait time from when the article is insufficient in the board work machine to when the operator starts replenishment work of the article, and a second time, which is a work time from when the operator starts the replenishment work to when the article is replenished in the board work machine. The display section is configured to display the first time and the second time when the article is insufficient in the board work machine to when the article is replenished.

9 Claims, 3 Drawing Sheets

(56) References Cited

FOREIGN PATENT DOCUMENTS

| | | |
|---|---|---|
| JP | 2006-210647 A | 8/2006 |
| JP | 2009-288986 A | 12/2009 |
| WO | WO 2018/138925 A1 | 8/2018 |

OTHER PUBLICATIONS

International Search Report dated Feb. 18, 2020 in PCT/JP2019/044966 filed on Nov. 15, 2019, 2 pages.

* cited by examiner

OPERATION STATUS DISPLAY DEVICE AND OPERATION STATUS DISPLAY METHOD

TECHNICAL FIELD

The present description discloses a technique relating to an operation status display device and an operation status display method.

BACKGROUND ART

A data processing device disclosed in Patent Literature 1 includes a display control section. The display control section displays a component supply wait time and the number of times of component supply side by side for multiple manufacturing lines. In an example of a display screen disclosed in Patent Literature 1, a first manufacturing line has a larger number of times of component supply than a second manufacturing line, and the component supply wait time is longer. Patent Literature 1 discloses that, in this case, a user can determine that the number of operators of the first manufacturing line is insufficient, and can consider the change of personal distribution of the operators.

In addition, in the example of the display screen disclosed in Patent Literature 1, a difference in the number of times of component supply is small between a third manufacturing line and the second manufacturing line, but the component supply wait time is long. Patent Literature 1 discloses that, in this case, in a case where the number of operators of the second manufacturing line and the number of operators of the third manufacturing line are the same as each other, there is a possibility that the operator in charge of the third manufacturing line has worse work efficiency than the operator in charge of the second manufacturing line.

PATENT LITERATURE

Patent Literature 1: International Publication No. WO2018/138925

BRIEF SUMMARY

Technical Problem

However, Patent Literature 1 does not disclose the details of the component supply wait time of the manufacturing line. Therefore, in the data processing device disclosed in Patent Literature 1, the user has a difficulty of grasping a wait time from when a component is insufficient to when the operator starts replenishment work of the component and a work time from when the operator starts the replenishment work to when the component is replenished.

In view of such circumstances, the present description discloses an operation status display device and an operation status display method in which a first time, which is a wait time from when an article is insufficient in a board work machine to when an operator starts replenishment work of the article, and a second time, which is a work time from when the operator starts the replenishment work to when the article is replenished in the board work machine, are displayed in a graph in a distinguishable manner.

Solution to Problem

The present description discloses an operation status display device configured to display an operation status of a board work machine configured to perform predetermined board work on a board, in which an operator replenishes an article to be used in production of a board product using the board work machine to produce the board product, and the operation status display device includes an acquisition section and a display section. The acquisition section is configured to acquire a first time, which is a wait time from when the article is insufficient in the board work machine to when the operator starts replenishment work of the article, and a second time, which is a work time from when the operator starts the replenishment work to when the article is replenished in the board work machine. The display section is configured to display the first time and the second time in a graph in a distinguishable manner, for a stop time of the board work machine from when the article is insufficient in the board work machine to when the article is replenished.

In addition, the present description discloses an operation status display method of displaying an operation status of a board work machine configured to perform predetermined board work on a board, in which an operator replenishes an article to be used in production of a board product using the board work machine to produce the board product, and the operation status display method includes an acquisition step and a display step. In the acquisition step, a first time, which is a wait time from when the article is insufficient in the board work machine to when the operator starts replenishment work of the article, and a second time, which is a work time from when the operator starts the replenishment work to when the article is replenished in the board work machine, are acquired. In the display step, the first time and the second time are displayed in a graph in a distinguishable manner, for a stop time of the board work machine from when the article is insufficient in the board work machine to when the article is replenished.

Advantageous Effects

The operation status display device described above includes the acquisition section and the display section. Therefore, the operation status display device described above can display the first time and the second time in a graph in a distinguishable manner. The above description of the operation status display device can be similarly applied to an operation status display method.

DESCRIPTION OF EMBODIMENTS

1. Embodiment

1-1. Configuration Example of Board Production Facility PF0

Figure 1:
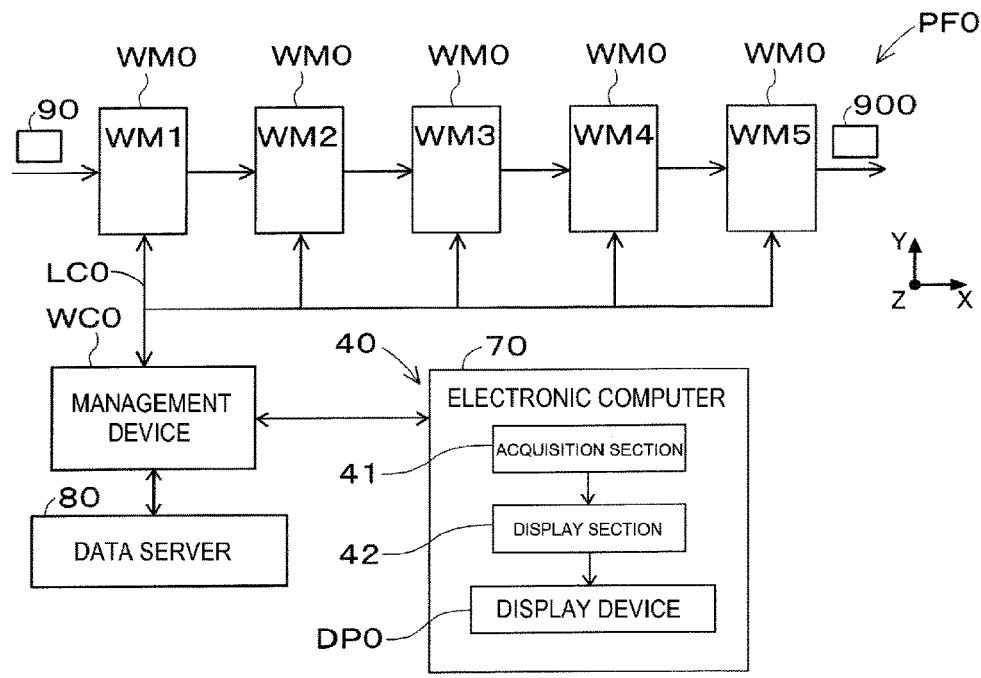
FIG. 1 is a configuration diagram showing a configuration example of a board production facility.

Board production facility PF0 produces board product 900 by using board work machine WM0 that performs predetermined board work on board 90. The type and number of board work machine WM0 are not limited. As shown in FIG. 1, board production facility PF0 of the present embodiment includes multiple (five) board work machines WM0 of printer WM1, printing inspector WM2, component mounter WM3, reflow furnace WM4, and appearance inspector WM5, and board 90 is conveyed in this order by a board conveyance device.

Printer WM1 prints solder on board 90 at a mounting position of each of multiple components 91. Printing inspector WM2 inspects a printing state of the solder which is printed by printer WM1. Component mounter WM3 mounts multiple components 91 on board 90 on which the solder is printed. One or multiple component mounters WM3 may be provided. In a case where multiple component mounters WM3 are provided, multiple component mounters WM3 can be shared to mount multiple components 91.

Reflow furnace WM4 heats board 90 on which multiple components 91 are mounted by component mounter WM3, causes the solder to melt, and performs soldering. Appearance inspector WM5 inspects a mounting state of multiple components 91 which are mounted by component mounter WM3. In this way, board production facility PF0 can use multiple (five) board work machines WM0 to convey board 90 in order and perform a production process including an inspection process to produce board product 900. It should be noted that board production facility PF0 can also include, as required, board work machines WM0 such as a function inspector, a buffer device, a board supply device, a board flipping device, a shield mounting device, an adhesive application device, and an ultraviolet ray irradiation device.

Multiple (five) board work machines WM0 and management device WC0 constituting board production facility PF0 are communicably connected by wired or wireless communication section LC0. In addition, various methods can be adopted as a communication method. In the present embodiment, a local area network (LAN) is composed of multiple (five) board work machines WM0 and management device WC0. As a result, multiple (five) board work machines WM0 can communicate with each other via communication section LC0. In addition, multiple (five) board work machines WM0 can communicate with management device WC0 via communication section LC0.

Management device WC0 controls multiple (five) board work machines WM0 constituting board production facility PF0, and monitors an operating status of board production facility PF0. Management device WC0 stores various control data for controlling multiple (five) board work machines WM0. Management device WC0 transmits the control data to each of multiple (five) board work machines WM0. In addition, each of multiple (five) board work machines WM0 transmits the operating status and a production status to management device WC0.

Management device WC0 can be provided with, for example, data server 80. Data server 80 can store, for example, the acquisition data acquired by board work machine WM0 in the board work. Various image data and the like captured by board work machine WM0 are included in the acquisition data. The record (log data) of the operation status acquired by board work machine WM0 is included in the acquisition data.

In addition, data server 80 can also store various production information on the production of board product 900. The production information includes, for example, shape-related information, such as information on the shape of component 91, information on image processing of the image data obtained by imaging component 91, information on the handling of component 91, information on imaging conditions in a case of imaging component 91, and information on the electrical characteristics of component 91. Package information, which is information on a supply method of component 91, is included in the production information. Further, inspection standard information used by the inspector, such as printing inspector WM2 and appearance inspector WM5, in a case of inspecting an inspection target object, and the inspection result by the inspector are included in the production information.

1-2. Configuration Example of Component Mounter WM3

Figure 2:
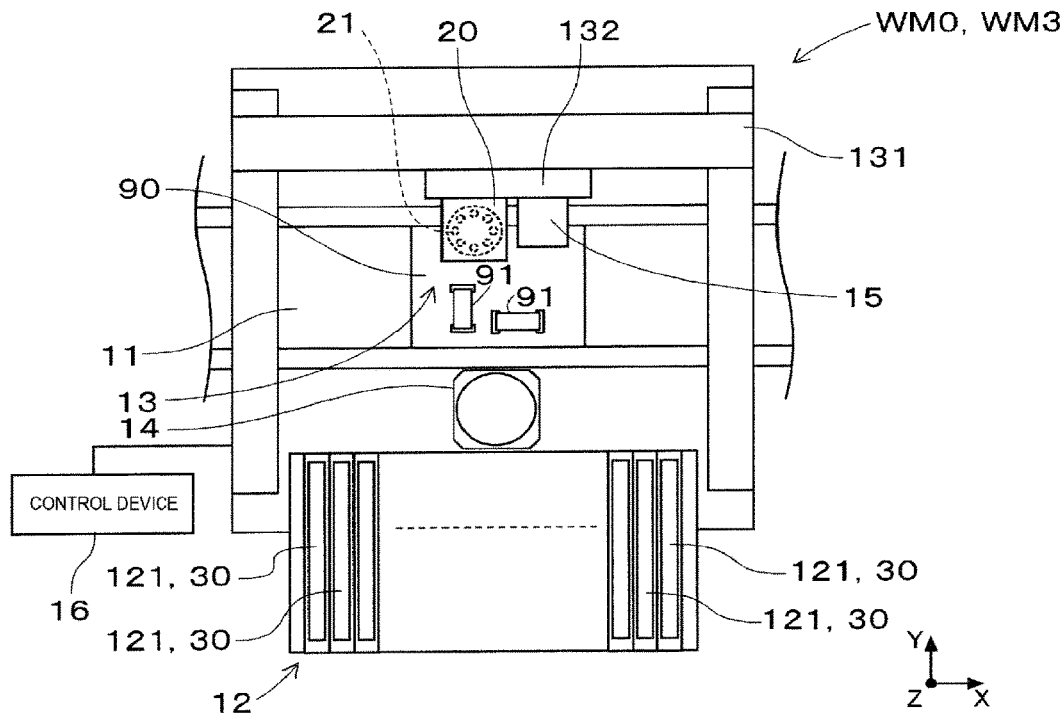
FIG. 2 is a plan view showing a configuration example of a component mounter.

Component mounter WM3 mounts multiple components 91 on board 90. As shown in FIG. 2, component mounter WM3 includes board conveyance device 11, component supply device 12, component transfer device 13, part camera 14, board camera 15, and control device 16. In the present description, a conveyance direction of board 90 is indicated as an X-axis direction. A direction orthogonal to the X-axis direction in a horizontal plane is indicated as a Y-axis direction. The directions orthogonal to the X-axis direction and the Y-axis direction are indicated as a Z-axis direction.

Board conveyance device 11 is, for example, composed of a belt conveyor, and conveys board 90 in the conveyance direction (X-axis direction). Board 90 is a circuit board, and at least one of an electronic circuit and an electrical circuit is formed thereon. Board conveyance device 11 carries board 90 in component mounter WM3, and positions board 90 at a predetermined position inside the machine. After a mounting process of multiple components 91 by component mounter WM3 is terminated, board conveyance device 11 carries board 90 out of component mounter WM3.

Component supply device 12 supplies multiple components 91 to be mounted on board 90. Component supply device 12 includes multiple feeders 121 that are provided along the conveyance direction of board 90 (X-axis direction). Each of multiple feeders 121 performs pitch-feeding of a carrier tape, in which multiple components 91 are accommodated, and supplies components 91 to be picked up at a supply position located on the distal end side of feeder 121. Also, component supply device 12 can supply the relatively large electronic component (lead component) as compared with the chip component or the like in a state of being disposed on a tray.

Component transfer device 13 includes head driving device 131 and moving body 132. Head driving device 131 is configured to move moving body 132 in the X-axis direction and the Y-axis direction by a linear motion mechanism. Mounting head 20 is detachably (exchangeably) mounted on moving body 132 by a clamp member. Mounting head 20 uses at least one holding member 21 to pick up and hold component 91 supplied by component supply device 12, and mounts component 91 to board 90 positioned by board conveyance device 11. As holding member 21, for example, a suction nozzle or a chuck can be used.

As part camera 14 and board camera 15, a known imaging device can be used. Part camera 14 is fixed to a base of component mounter WM3 such that an optical axis thereof is directed upward (vertically upward) in the Z-axis direction. Part camera 14 can image component 91 held by holding member 21 from below. Board camera 15 is provided in moving body 132 of component transfer device 13 such that an optical axis thereof is directed downward in the Z-axis direction (vertically downward). Board camera 15 can image board 90 from above. Part camera 14 and board camera 15 perform imaging based on control signals transmitted from control device 16. The image data captured by part camera 14 and board camera 15 are transmitted to control device 16.

Control device 16 includes a known arithmetic device and a storage device, and constitutes a control circuit. The information, image data, and the like output from various sensors provided in component mounter WM3 are input to control device 16. Control device 16 transmits control signals to each device based on a control program, a predetermined mounting condition set in advance, and the like.

For example, control device 16 causes board camera 15 to image board 90 which is positioned by board conveyance device 11. Control device 16 performs image processing on the image captured by board camera 15 to recognize a positioning state of board 90. Further, control device 16 causes holding member 21 to pick up and hold component 91 supplied by component supply device 12 and causes part camera 14 to image component 91 held by holding member 21. Control device 16 performs the image processing on the image captured by part camera 14 to recognize suitability of component 91 and a holding posture of component 91.

Control device 16 moves holding member 21 toward above a scheduled mounting position, which is set in advance by the control program or the like. Further, based on the positioning state of board 90, the holding posture of component 91, and the like, control device 16 corrects the scheduled mounting position to set the mounting position on which component 91 is actually mounted. The scheduled mounting position and the mounting position include a rotation angle in addition to the position (X-coordinate and Y-coordinate).

Control device 16 corrects a target position (X-coordinate and Y-coordinate) and the rotation angle of the holding member 21 in accordance with the mounting position. Control device 16 lowers holding member 21 at the corrected rotation angle at the corrected target position, and mounts component 91 on board 90. Control device 16 repeats a pick-and-place cycle to perform the mounting process of mounting multiple components 91 on board 90.

1-3. Replenishment of Article 30 and Stop Time TN0 of Board Work Machine WM0

In board work machine WM0 of the present embodiment, the operator replenishes article 30 used in the production of board product 900 using board work machine WM0 to produce board product 900. For example, in a case where board work machine WM0 is component mounter WM3 described above, feeder 121 is included in article 30. In a case where component 91 accommodated in the carrier tape of feeder 121 are insufficient in component mounter WM3, component mounter WM3 instructs the operator to replenish component 91 (replenish feeder 121).

In a case where the operator is instructed to replenish component 91 (replenish feeder 121), the operator removes feeder 121 in which component 91 is insufficient from the slot of component supply device 12, and installs feeder 121 accommodating component 91 for replenishment in the designated slot. As described above, the insufficiency of article 30 includes the insufficiency of the supplies (in this case, component 91) supplied from article 30. In addition, article 30 is not limited to feeder 121. For example, the reel that accommodates the carrier tape is included in article 30. In this case, the operator removes feeder 121 in which component 91 is insufficient and extracts the reel from feeder 121. Moreover, the operator attaches the reel accommodating component 91 for replenishment to feeder 121, and installs feeder 121 in the designated slot.

Similarly, a component tray accommodating multiple components 91 is included in article 30. In addition, board 90 (board 90 on which the solder is not printed and component 91 is not mounted) supplied to printer WM1 is included in article 30. Further, in a case where board work machine WM0 is printer WM1, for example, the solder accommodating container is included in article 30. In any case, the operator can replenish insufficient article 30 in board work machine WM0. In addition, the operator can also collect article 30 that is no longer needed in board work machine WM0.

Figure 3:
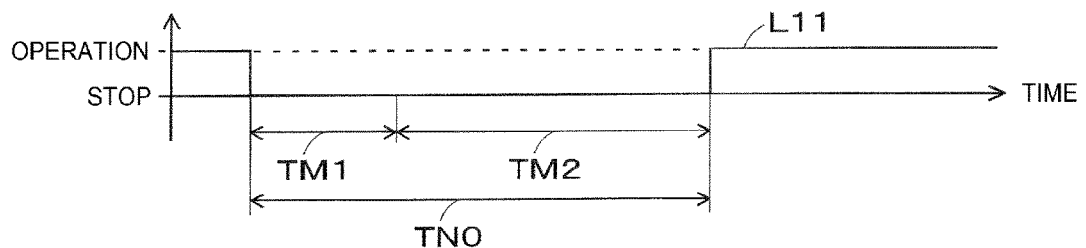
FIG. 3 is a schematic diagram showing an example of a relationship between a first time, a second time, and a stop time of a board work machine.

As described above, since board work machine WM0 of the present embodiment produces board product 900 while article 30 is replenished, board work machine WM0 stops the production of board product 900 in order to receive the replenishment of article 30. FIG. 3 schematically shows an example of a relationship between first time TM1, second time TM2, and stop time TN0 of board work machine WM0. The horizontal axis of FIG. 3 indicates the time, and the vertical axis indicates an operation state or a stopped state of board work machine WM0. The operation state means a state in which board work machine WM0 produces board product 900. The stopped state means a state in which board work machine WM0 stops the production of board product 900 due to the insufficiency of article 30.

In addition, polygonal line L11 indicates an example of a temporal change in the operation status of board work machine WM0. Polygonal line L11 indicates that board work machine WM0 shifts from the operation state to the stopped state, and shifts to the operation state after the stopped state continues for stop time TN0. Stop time TN0 of board work machine WM0 means the time from when article 30 is insufficient in board work machine WM0 to when article 30 is replenished. As shown in FIG. 3, stop time TN0 is the time obtained by adding first time TM1 and second time TM2. First time TM1 refers to the wait time from when article 30 is insufficient in board work machine WM0 to when the operator starts the replenishment work of article 30. Second time TM2 refers to the work time from when the operator starts the replenishment work to when article 30 is replenished to board work machine WM0.

In the conventional art, first time TM1 and second time TM2 are not considered, and it is difficult for the user to grasp first time TM1 and second time TM2. Therefore, in the present embodiment, operation status display device 40 that displays the operation status of board work machine WM0 is provided. Operation status display device 40 displays first time TM1 and second time TM2 in a graph in a distinguishable manner.

1-4. Configuration Example of Operation Status Display Device 40

Operation status display device 40 can be provided in various electronic computers, control devices, and the like. As shown in FIG. 1, operation status display device 40 of the present embodiment is provided in electronic computer 70. Electronic computer 70 includes a known arithmetic device, storage device, input device, and output device (including display device DP0). Operation status display device 40 can also be formed, for example, on board work machine WM0, management device WC0, a host computer that manages multiple board production facilities PF0, and a cloud.

In addition, operation status display device 40 includes acquisition section 41 and display section 42 when regarded as a control block. Further, operation status display device 40 executes control in accordance with a flowchart shown in FIG. 4. Acquisition section 41 performs a process shown in step S11. Display section 42 performs a process shown in step S12.

1-4-1. Acquisition Section 41

Figure 4:
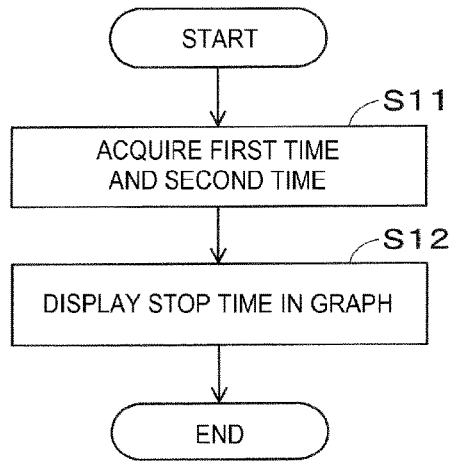
FIG. 4 is a flowchart showing an example of a control procedure of an operation status display device.

Acquisition section 41 acquires first time TM1 and second time TM2 (step S11 shown in FIG. 4). Acquisition section 41 can acquire first time TM1 and second time TM2 from, for example, the record (log data) of the operation status acquired by board work machine WM0. For example, it is assumed that article 30 is feeder 121 shown in FIG. 2. In this case, in a case where feeder 121 is installed in the slot, the operator reads an identification code attached to feeder 121 by using a reading device, and installs feeder 121 in a predetermined slot of component supply device 12.

In a case where feeder 121 is installed in the slot, electric power is supplied from component mounter WM3 via a connector, and feeder 121 is in a state of being able to communicate with component mounter WM3. As a result, the slot of component supply device 12 is associated with identification information of feeder 121 installed in the slot, and attachment information indicating that feeder 121 is installed is recorded. On the contrary, in a case where feeder 121 is removed from the slot, component mounter WM3 cannot communicate with feeder 121. As a result, removal information indicating that feeder 121 is removed is recorded. In addition, component mounter WM3 counts the supply number of components 91 supplied from component supply device 12, and determines that component 91 accommodated in feeder 121 is insufficient in a case where the supply number of components 91 reaches a predetermined number. As a result, insufficiency information indicating that component 91 is insufficient is recorded.

As described above, the record of the operation status (log data) is stored in data server 80 shown in FIG. 1. Therefore, acquisition section 41 of the present embodiment can acquire the record (log data) of the operation status from data server 80 to acquire first time TM1 and second time TM2. Specifically, acquisition section 41 acquires the insufficiency information of component 91 accommodated in feeder 121 and the removal information of feeder 121. Acquisition section 41 acquires the time between the time when component 91 is insufficient, which is included in the insufficiency information (time when component mounter WM3 is stopped), and the time when feeder 121 is removed, which included in the removal information (time when the operator starts the replenishment work), as first time TM1.

In addition, acquisition section 41 acquires the removal information of feeder 121 in which component 91 is insufficient and the attachment information of feeder 121 accommodating component 91 for replenishment. Acquisition section 41 acquires the time between the time when feeder 121 is removed, which is included in the removal information (time when the operator starts the replenishment work), and the time when feeder 121 is installed, which is included in the attachment information (time when component 91 is replenished), as second time TM2. It should be noted that the above description of feeder 121 can be similarly applied to another article 30 described above. In addition, the attachment and detachment of article 30 can also be known by using, for example, a detection signal of a detector that detects attachment and detachment. Further, in a case where the operator starts the replenishment work, for example, a reset button of board work machine WM0 or article 30 may be operated. In this case, acquisition section 41 can also determine that the time when the operator performs the operation is the time when the operator starts the replenishment work.

1-4-2. Display Section 42

Display section 42 displays first time TM1 and second time TM2 in a graph in a distinguishable manner for stop time TN0 of board work machine WM0 from when article 30 is insufficient in board work machine WM0 to when article 30 is replenished (step S12 shown in FIG. 4). Display section 42 can display, for example, display device DP0 shown in FIG. 1 in a graph. As display device DP0, a known display device, such as a liquid crystal display device, can be used. In this case, display device DP0 displays first time TM1 and second time TM2 in a graph in a distinguishable manner.

Figure 5:
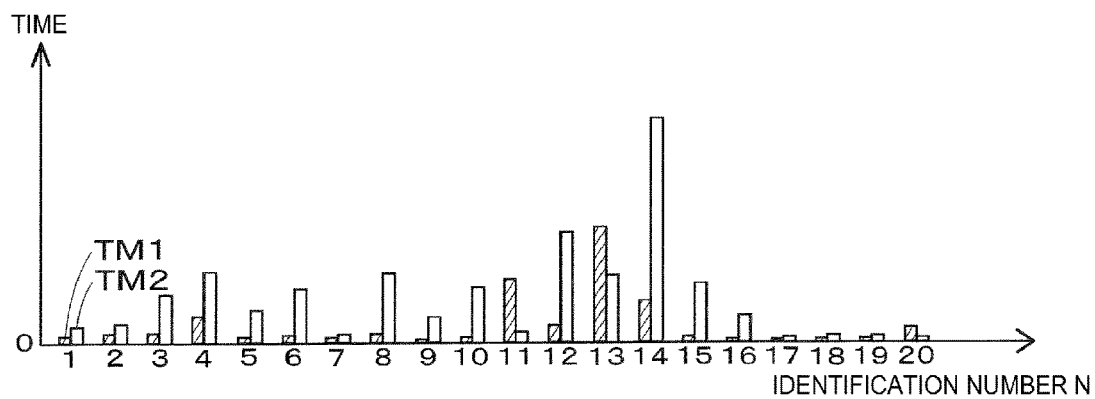
FIG. 5 is a schematic diagram showing an example of a graph display by a display section.

In addition, a display format of the graph display is not limited, and display section 42 can display first time TM1 and second time TM2 in various display formats in a graph in a distinguishable manner. FIG. 5 shows an example of a graph display by display section 42. In FIG. 5, first time TM1 and second time TM2 for each board work machine WM0 are indicated as bar graphs. The horizontal axis of FIG. 5 indicates identification number N of board work machine WM0, and the vertical axis indicates the time.

Figure 6:
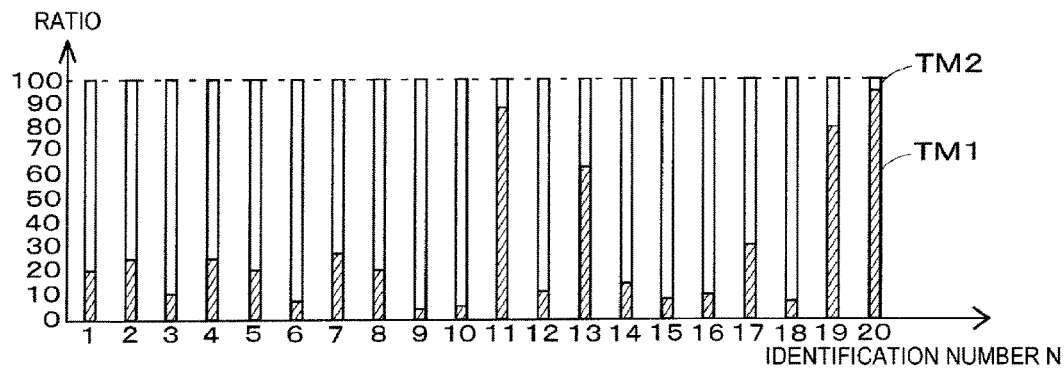
FIG. 6 is a schematic diagram showing another example of the graph display by the display section.

FIG. 6 shows another example of the graph display by display section 42. In FIG. 6, a ratio of first time TM1 and second time TM2 for each board work machine WM0 is indicated by a bar graph. The horizontal axis of FIG. 6 indicates identification number N of board work machine WM0, and the vertical axis indicates the ratio (0% to 100%) of first time TM1 and second time TM2. It should be noted that, in FIGS. 5 and 6, for convenience of illustration, some bar graphs are numbered, and other bar graphs are omitted. The bar graph with diagonal lines indicates first time TM1, and the bar graph without diagonal lines indicates second time TM2. The above description of the sign number of the bar graph can be similarly applied to FIGS. 7 and 8.

In any of the embodiments shown in FIGS. 5 and 6, display section 42 can display first time TM1 and second time TM2 in a graph in a distinguishable manner for multiple board work machines WM0 of the same type. Display section 42 can display, for example, multiple component mounters WM3 in a graph. In addition, display section 42 can also display first time TM1 and second time TM2 in a graph in a distinguishable manner for multiple types of multiple board work machines WM0. Display section 42 can also display, for example, printer WM1 and multiple component mounters WM3 in a graph.

Further, display section 42 can also display first time TM1 and second time TM2 in a graph in a distinguishable manner for multiple board work machines WM0 of the same type of different board production facilities PF0. In addition, display section 42 can also display first time TM1 and second time TM2 in a graph in a distinguishable manner for multiple types of multiple board work machines WM0 of different board production facilities PF0.

In FIGS. 5 and 6, first time TM1 and second time TM2 are displayed in a graph in a distinguishable manner for stop time TN0 of board work machine WM0. Therefore, the user of operation status display device 40 can easily grasp first time TM1 and second time TM2 for stop time TN0 of board work machine WM0. For example, board work machine WM0 having identification number N10 shown in FIG. 5 has shorter first time TM1 than second time TM2. On the other hand, board work machine WM0 having identification number N11 has longer first time TM1 than second time TM2. In addition, in board work machine WM0 having identification number N10 shown in FIG. 6, the ratio of first time TM1 is smaller than that of second time TM2. On the other hand, in board work machine WM0 having identification number N11, the ratio of first time TM1 is larger than that of second time TM2.

Board work machine WM0 notifies the operator of notice information indicating that article 30 is insufficient before article 30 is insufficient. In a case where the notice information is notified, the operator can prepare the replenishment work of article 30. Specifically, the operator prepares article 30 for replenishment in board work machine WM0 before article 30 is insufficient. In a case where article 30 is feeder 121, the operator prepares, for example, feeder 121 for replenishment in component mounter WM3. In addition, the operator can also prepare, for example, the reel in which component 91 for replenishment are accommodated in component mounter WM3.

In a case where the preparation for the replenishment work is performed, the operator can immediately perform the replenishment work for article 30, so that second time TM2 tends to be short. On the contrary, in a case where the preparation for the replenishment work is not performed, the operator needs to first prepare article 30 for replenishment, and second time TM2 tends to be long. There is a possibility that the operator of board work machine WM0 having identification number N10 having longer second time TM2 than first time TM1 does not prepare the replenishment work of article 30. In addition, the insufficiency of article 30 is guided to the operator by, for example, a display lamp and a warning sound provided in board work machine WM0. There is a possibility that the operator of board work machine WM0 having identification number N11 having longer first time TM1 than second time TM2 is delayed in being aware that the insufficiency of article 30 occurs.

Further, there is also a possibility that the operator of board work machine WM0 having identification number N11 is aware that article 30 is insufficient, but is delayed in starting the replenishment work of article 30 due to another work. In addition, there is also a possibility that the operator of board work machine WM0 having identification number N11 is aware that article 30 is insufficient, but is delayed in starting the replenishment work of article 30 without a proper reason. The above description of first time TM1 and second time TM2 can be similarly applied to the ratio of first time TM1 and second time TM2.

1-4-3. Preferred Embodiment

In the embodiments shown in FIGS. 5 and 6, it is difficult for the user of operation status display device 40 to acquire time-series information. Therefore, acquisition section 41 may divide a production time zone in which board work machine WM0 produces board product 900 by predetermined unit time TU0, and total first time TM1 and second time TM2 for each unit time TU0. In addition, display section 42 may display first time TM1 and second time TM2 for each unit time TU0 totaled by acquisition section 41 in a time series. Further, acquisition section 41 totals the insufficient number of articles 30 for each unit time TU0, and display section 42 may display the insufficient number of articles 30 for each unit time TU0 totaled by acquisition section 41 in a time series.

Figure 7:
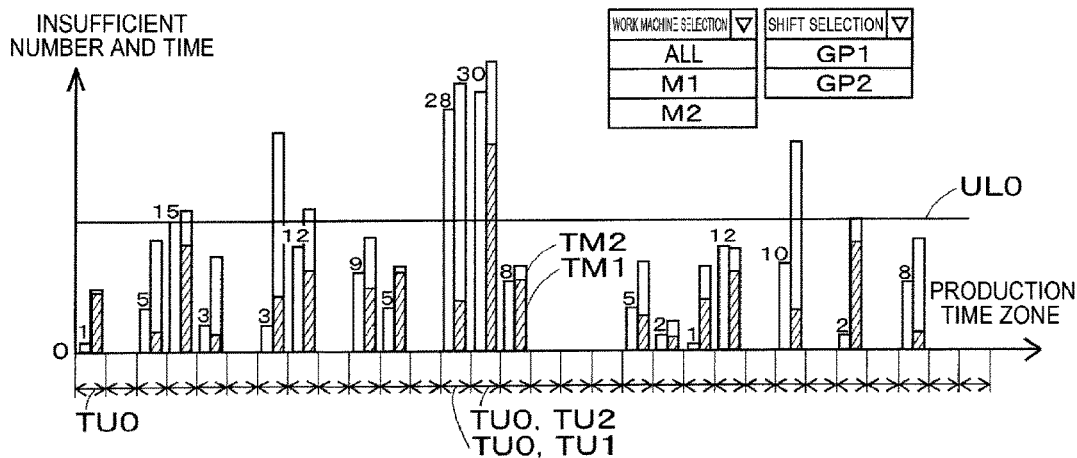
FIG. 7 is a schematic diagram showing still another example of the graph display by the display section.

FIG. 7 shows still another example of the graph display by display section 42. In FIG. 7, first time TM1 and second time TM2 for each unit time TU0 are indicated by the bar graph on the right side. In addition, in FIG. 7, the insufficient number of articles 30 for each unit time TU0 is indicated by the bar graph on the left side. The number at the upper part of the bar graph on the left indicates the insufficient number of articles 30 for each unit time TU0. In addition, the horizontal axis of FIG. 7 indicates the production time zone, and the vertical axis indicates the insufficient number of articles 30 or the time.

Unit time TU0 can be optionally set within a range in which the trends of first time TM1 and second time TM2 can be grasped. Unit time TU0 can be set, for example, based on a required time for the replenishment work, which is required for one operator to replenish one article 30. For example, in a case where the required time is 1 minute, unit time TU0 can be set to, for example, 10 minutes to 15 minutes. For example, in a case where the required time is 10 minutes, unit time TU0 can be set to, for example, 1 hour to 2 hours. It should be noted that, in FIG. 7, for convenience of illustration, a sign number is assigned to some unit time TU0, and a sign number is omitted for other unit times TU0. The above description of unit time TU0 can be similarly applied to FIG. 8.

For example, in first unit time TU1, which is one unit time TU0 among multiple unit times TU0 shown in FIG. 7, the insufficient number of articles 30 is 28. Therefore, acquisition section 41 totals first time TM1 of the 28 replenishment works and totals second time TM2 of the 28 replenishment works. Acquisition section 41 also totals first time TM1 and second time TM2 for other unit times TU0. In addition, in second unit time TU2, which is another unit time TU0 among multiple unit times TU0, the insufficient number of articles 30 is 30. First unit time TU1 and second unit time TU2 have almost the same insufficient number of articles 30, but a magnitude relationship between first time TM1 and second time TM2 is significantly different. Specifically, in first unit time TU1, first time TM1 is shorter than second time TM2. It is considered that, since there was no insufficiency of article 30 in unit time TU0 immediately before first unit time TU1, the operator can prepare the replenishment work of article 30 in first unit time TU1. Therefore, it is considered that the operator can immediately perform the replenishment work of article 30 in first unit time TU1, but the insufficient number of articles 30 is increased (rush of the replenishment work), so that second time TM2 increased.

On the other hand, in second unit time TU2, first time TM1 is longer than second time TM2. Second unit time TU2 is unit time TU0 immediately after first unit time TU1. Therefore, it is considered that, since the operator is delayed in being aware that article 30 is insufficient in second unit time TU2 due to the rush of the replenishment work in first unit time TU1 or performs the replenishment work in first unit time TU1, the operator is delayed in starting the replenishment work in second unit time TU2. In addition, it is considered that the preparation for the replenishment work of article 30 in second unit time TU2 is not performed due to the rush of the replenishment work in first unit time TU1. As described above, in a case where the replenishment work is not prepared, the operator needs to first prepare article 30 for replenishment, and second time TM2 tends to be long. However, for example, it is considered that second time TM2 can be significantly shortened as compared with first unit time TU1 by the replenishment work by an assistance operator, the package replenishment work of multiple articles 30, and the like.

Acquisition section 41 can also divide the production time zone in which board work machine WM0 produces board product 900 by predetermined unit time TU0, and total the ratio of first time TM1 and second time TM2 for each unit time TU0. In this case, display section 42 can display the ratio of first time TM1 and second time TM2 for each unit time TU0 totaled by acquisition section 41 in a time series.

Figure 8:
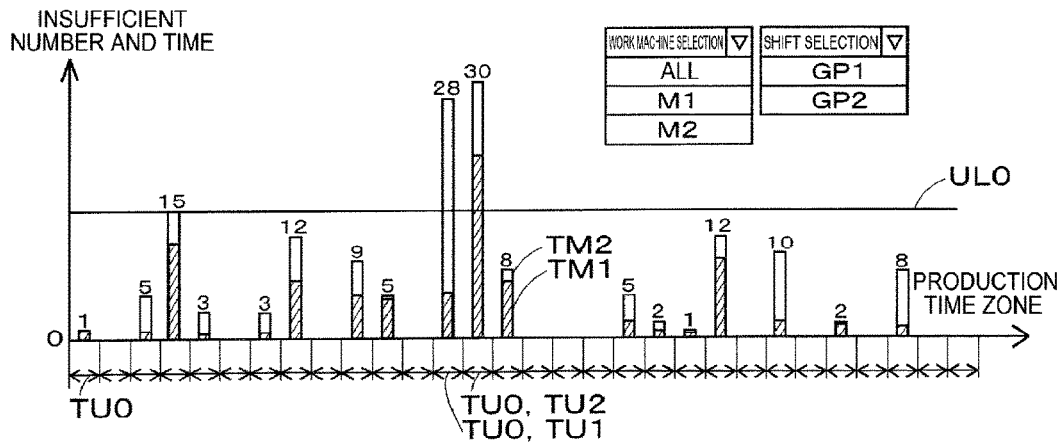
FIG. 8 is a schematic diagram showing still another example of the graph display by the display section.

FIG. 8 shows still another example of the graph display by display section 42. In FIG. 8, the ratio of first time TM1 and second time TM2 for each unit time TU0 is indicated as a bar graph. In addition, in FIG. 8, the insufficient number of articles 30 for each unit time TU0 is indicated by the numerical value at the upper part of the bar graph. Further, the horizontal axis of FIG. 8 indicates the production time zone, and the vertical axis indicates the insufficient number of articles 30 or the ratio described above. For example, in first unit time TU1, which is one unit time TU0 among multiple unit times TU0, the insufficient number of articles 30 is 28. Therefore, acquisition section 41 totals first time TM1 of the 28 replenishment works, totals second time TM2 of the 28 replenishment works, and totals the ratio of first time TM1 and second time TM2. Acquisition section 41 also totals the ratio of first time TM1 and second time TM2 for other unit times TU0. The above description of the embodiment shown in FIG. 7 can be similarly applied to the embodiment shown in FIG. 8.

In addition, for example, it is assumed that unit time TU0 is set to 15 minutes when the required time for the replenishment work, which is required for one operator to replenish one article 30, is 1 minute. In this case, the maximum number of articles 30 for which one operator can perform the replenishment work in unit time TU0 is 15. That is, it is difficult for one operator to perform replenishment work more than the 15 replenishment works of articles 30 in unit time TU0. Further, the required time for the replenishment work of article 30 may differ depending on the type of article 30.

Therefore, display section 42 may display upper limit line UL0 indicating the maximum number of articles 30 for which the operator can perform the replenishment work in unit time TU0. Upper limit line UL0 may be set based on at least one of the type of article 30 and the work ability of the operator. As a result, the user of operation status display device 40 can easily grasp the rush of the replenishment work. As shown in FIGS. 7 and 8, for example, in first unit time TU1 and second unit time TU2, the insufficient number of articles 30 for each unit time TU0 exceeds upper limit line UL0. Therefore, the user of operation status display device 40 can easily grasp that the rush of the replenishment work occurs in first unit time TU1 and second unit time TU2.

It should be noted that a jig is used in a case where the replenishment work of article 30 is performed, it may take time to prepare the jig. Therefore, the type of article 30 considered in a case where upper limit line UL0 is set may include the type of the jig used in a case where the replenishment work of article 30 is performed in addition to the type of article 30 itself. In addition, the work ability of the operators varies. Therefore, upper limit line UL0 can also be set in accordance with the work ability of the operator who actually performs the work. The work ability of the operator can be acquired or estimated from the past work results. Further, in a case where multiple operators perform the work, the work ability of the operator includes the work ability for the number of people.

Board production facility PF0 of the present embodiment includes multiple board work machines WM0. In this case, acquisition section 41 can acquire first time TM1 and second time TM2 for multiple board work machines WM0. In addition, acquisition section 41 can also acquire first time TM1 and second time TM2 for designated board work machine WM0 among multiple board work machines WM0.

Acquisition section 41 can acquire first time TM1 and second time TM2 for multiple board work machines WM0 of the same type. For example, as shown in FIGS. 7 and 8, the user of operation status display device 40 can select "all" in a work machine selection field. In this case, acquisition section 41 can acquire first time TM1 and second time TM2 for, for example, multiple component mounters WM3. Therefore, the user of operation status display device 40 can grasp the tendency of first time TM1 and second time TM2 for the whole of multiple component mounters WM3. In addition, the user of operation status display device 40 can also select desired component mounter WM3 (for example, work machine M1 or work machine M2) in the work machine selection field. In this case, acquisition section 41 can acquire first time TM1 and second time TM2 for designated component mounter WM3 among multiple component mounters WM3. Therefore, the user of operation status display device 40 can grasp the tendency of first time TM1 and second time TM2 for designated component mounter WM3 (for example, the bottleneck component mounter WM3).

In addition, acquisition section 41 can also acquire first time TM1 and second time TM2 for multiple types of multiple board work machines WM0. Acquisition section 41 can also acquire first time TM1 and second time TM2 for, for example, printer WM1 and multiple component mounters WM3. Further, acquisition section 41 can also acquire first time TM1 and second time TM2 for multiple board work machines WM0 of the same type of different board production facilities PF0. In addition, acquisition section 41 can also acquire first time TM1 and second time TM2 for multiple types of multiple board work machines WM0 of different board production facilities PF0.

In either case, acquisition section 41 totals first time TM1 and second time TM2 for each unit time TU0 for acquired first time TM1 and second time TM2. Moreover, display section 42 can display first time TM1 and second time TM2 for each unit time TU0 totaled by acquisition section 41 in a time series. Similarly, acquisition section 41 can also acquire the insufficient number of articles 30 for designated board work machine WM0 among multiple board work machines WM0 or multiple board work machines WM0, and total the insufficient number of articles 30 for each unit time TU0. Moreover, display section 42 can also display the insufficient number of articles 30 for each unit time TU0 totaled by acquisition section 41 in a time series.

In addition, the operation status of board work machine WM0 and the work efficiency of the replenishment work of article 30 may differ depending on the work time zone of the operator. Therefore, acquisition section 41 can also acquire first time TM1 and second time TM2 based on the work time zone of the operator. Specifically, the operator belongs to first group GP1 working in a predetermined first time zone or second group GP2 working in a time zone different from the first time zone. For example, the first time zone is a day shift work time zone, and the time zone different from the first time zone is a night shift work time zone. In this case, acquisition section 41 can acquire first time TM1 and second time TM2 for the replenishment work of the operator belonging to first group GP1 or second group GP2.

For example, as shown in FIGS. 7 and 8, the user of operation status display device 40 can select "first group GP1" or "second group GP2" in a shift selection field. Acquisition section 41 can acquire first time TM1 and second time TM2 for the replenishment work of the operator belonging to the selected group. Acquisition section 41 totals first time TM1 and second time TM2 for each unit time TU0 for acquired first time TM1 and second time TM2. Moreover, display section 42 can display first time TM1 and second time TM2 for each unit time TU0 totaled by acquisition section 41 in a time series.

Similarly, acquisition section 41 can also acquire the insufficient number of articles 30 for the replenishment work of the operator belonging to first group GP1 or second group GP2, and totals the insufficient number of articles 30 for each unit time TU0. Moreover, display section 42 can also display the insufficient number of articles 30 for each unit time TU0 totaled by acquisition section 41 in a time series.

2. Operation Status Display Method

The above description of operation status display device 40 can be similarly applied to the operation status display method. Specifically, the operation status display method includes an acquisition step and a display step. The acquisition step corresponds to the control performed by acquisition section 41. The display step corresponds to the control performed by display section 42.

3. Example of Effects of Embodiment

Operation status display device 40 includes acquisition section 41 and display section 42. Therefore, operation status display device 40 can display first time TM1 and second time TM2 in a graph in a distinguishable manner. The above description of operation status display device 40 can be similarly applied to the operation status display method.

REFERENCE SIGNS LIST

30: article, 40: operation status display device, 41: acquisition section, 42: display section, 90: board, 900: board product, TM1: first time, TM2: second time, TN0: stop time, TU0: unit time, UL0: upper limit line, PF0: board production facility, WM0: board work machine, GP1: first group, GP2: second group

The invention claimed is:

1. An operation status display device configured to display an operation status of a board work machine configured to perform predetermined board work on a board, in which an operator replenishes an article to be used in production of a board product using the board work machine to produce the board product, the operation status display device comprising:
    an acquisition section configured to acquire a first time, which is a wait time from when the article is insufficient in the board work machine to when the operator starts replenishment work of the article, and a second time, which is a work time from when the operator starts the replenishment work to when the article is replenished in the board work machine; and
    a display section configured to display the first time and the second time in a graph in a distinguishable manner, for a stop time of the board work machine from when the article is insufficient in the board work machine to when the article is replenished.

2. The operation status display device according to claim 1,
    wherein the acquisition section is configured to divide a production time zone in which the board work machine produces the board product by a predetermined unit time to total the first time and the second time for each unit time, and
    the display section is configured to display the first time and the second time, which are totaled by the acquisition section for each unit time, in a time series.

3. The operation status display device according to claim 2,
    wherein the acquisition section is configured to total the insufficient number of the articles for each unit time, and
    the display section is configured to display the insufficient number of the articles, which is totaled by the acquisition section for each unit time, in a time series.

4. The operation status display device according to claim 2,
    wherein the display section is configured to display an upper limit line indicating a maximum number of the articles for which the operator is able to perform the replenishment work in the unit time.

5. The operation status display device according to claim 4,
    wherein the upper limit line is set based on at least one of a type of the article and work ability of the operator.

6. The operation status display device according to claim 1,
    wherein the acquisition section is configured to divide a production time zone in which the board work machine produces the board product by a predetermined unit time to total a ratio of the first time and the second time for each unit time, and
    the display section is configured to display the ratio of the first time and the second time, which is totaled by the acquisition section for each unit time, in a time series.

7. The operation status display device according to claim 1,
    wherein a board production facility includes multiple board work machines, and
    the acquisition section is configured to acquire the first time and the second time for the multiple board work machines or a designated board work machine among the multiple board work machines.

8. The operation status display device according to claim 1,
    wherein the operator belongs to a first group working in a predetermined first time zone or a second group working in a time zone different from the first time zone, and
    the acquisition section is configured to acquire the first time and the second time for the replenishment work of the operator belonging to the first group or the second group.

9. An operation status display method of displaying an operation status of a board work machine configured to perform predetermined board work on a board, in which an operator replenishes an article to be used in production of a board product using the board work machine to produce the board product, the operation status display method comprising:
    an acquisition step of acquiring a first time, which is a wait time from when the article is insufficient in the board work machine to when the operator starts replenishment work of the article, and a second time, which is a work time from when the operator starts the replenishment work to when the article is replenished in the board work machine; and
    a display step of displaying the first time and the second time in a graph in a distinguishable manner, for a stop time of the board work machine from when the article is insufficient in the board work machine to when the article is replenished.

* * * * *